United States Patent Office 3,579,492
Patented May 18, 1971

3,579,492
METHOD FOR PREPARING LONG CHAIN ALKYL COMPOUNDS
William Novis Smith, Jr., Exton, Pa., assignor to Foote Mineral Company, Exton, Pa.
No Drawing. Filed Apr. 18, 1968, Ser. No. 722,179
Int. Cl. C08f 1/76, 3/06
U.S. Cl. 260—94.9
10 Claims

ABSTRACT OF THE DISCLOSURE

Ethylene is polymerized in a solution of an n-butyllithium: N,N,N',N'-tetramethylethylene diamine complex under temperature and pressure conditions selected from a narrow range of each until substantially all of the resulting polymer has precipitated from the solution as a long chain n-alkyllithium compound which may be converted to the corresponding polyethylene having a molecular weight from about 1500 to about 4000 with a Mw/Mn ratio of about 1.

BACKGROUND OF THE INVENTION

The polymerization of ethylene in the presence of an n-alkyllithium: N,N,N',N'-tetramethylethylene diamine (TMEDA) complex in a saturated hydrocarbon system to form a long chain alkyllithium material convertible to the corresponding polyethylene is known (see, for example, French patent 1,425,276; "Reactions of Chelated Organo Lithium Compounds" by A. W. Langner, Jr. in Transactions New York Academy of Sciences, pp. 741–747 (1965); "Telomerization: What You Should Know" by W. A. Butte in Hydrocarbon Processing, pp. 277–280, (September 1966); "Recent Developments in the Catalytic Applications of the Organoalkali Metal Compounds," by G. G. Eberhardt in Organometallic Chemistry Reviews, pp. 491–501 (1966); and "Polymerization and Telomerization Reaction of Olefins with a Tertiary Amine-Coordinated Lithiumalkyl Catalyst" by G. G. Eberhardt et al. in Journal of Polymer Science, Part A, vol. 3, pp. 3753–3762 (1965).

The conditions employed according to the prior art varied widely, although high pressures (1000 p.s.i. or more) appear to be preferred. In any event, so far as is known, the resulting products are mixtures of compounds of varying molecular weights; that is, there is a relatively wide spread between the lowest molecular weight material and the highest molecular weight material in such a product providing a ratio of the weight average molecular weight (Mw) to the number average molecular weight (Mn) far from unity.

It is the principal object of the present invention to provide a method for preparing a long chain n-alkyllithium compound of substantially definite number of carbon atoms.

It is another object of the present invention to provide a method for preparing a long chain n-alkyllithium compound of substantially definite composition in terms of number of carbon atoms which can be used as a starting material in the preparation of other polymers, high molecular weight alcohols and acids, and the like.

Still another principal object of the present invention is to provide a method for preparing a highly crystalline polyethylene having a molecular weight in the range of about 1500 to about 4000 in which the ratio of Mw to Mn is near 1.

These and other objects will become apparent from a consideration of the following specification and claims.

SUMMARY OF THE INVENTION

The method of the present invention comprises contacting ethylene with a solution of n-butyllithium: TMEDA complex (substantially 1:1 under ratio) in a liquid alkane having from 4 to 16 carbon atoms at a temperature no higher than 75° C. and an ethylene pressure between about 30 and about 150 p.s.i.g. until the product has substantially all precipitated from said solution as a long chain n-alkyllithium compound.

The precipitated long chain n-alkyllithium compound (actually a complex with 1 mol of TMEDA) is an excellent source of n-alkyllithium for use in other reactions in which shorter chain n-alkyllithium compounds have been used. For example, if butadiene or styrene is added to the long chain n-alkyllithium slurry, a moderately exothermic reaction takes place and the slurry becomes solid. Addition of a short chain alcohol and then water removes the lithium, and drying the block polymer provides a white hard resin. The same can be done with isoprene although the polymerization proceeds more slowly and the molecular weight of the block polymer is lower. Reaction of benzophenone, benzaldehyde and acetone, respectively, with the long chain n-alkyllithium slurry provides high molecular weight alcohols. Similarly, addition of the long chain n-alkyllithium to solid carbon dioxide provides the corresponding long chain carboxylic acid. Reaction of allyl bromide and benzyl bromide, respectively, with the long chain n-alkyllithium provides the corresponding long chain $\alpha$-olefin and n-alkylbenzene, respectively.

On the other hand, the long chain n-alkyllithium may be converted to the corresponding polyethylene by hydrolysis using a lower alcohol or water, or preferably both. The lower alcohol used may be any saturated aliphatic aliphatic alcohol containing from 1 to 4 carbon atoms, such as methanol, ethanol, isopropanol and n-butanol. Preferably, alcohol is added first, because of its solubility in the alkane solvent resulting in a more rapid hydrolysis, followed by water which, in this case, is used primarily to dissolve the resulting lithium salts and the TMEDA. Although theoretically 1 mol of alcohol and/or water per mol of long chain n-alkyllithium is required for hydrolysis, in practice a large excess is employed. For example, for hydrolysis with an alcohol from about 10 to 1000 molar excess of alcohol is preferred, and then sufficient water is then preferably added to dissolve the alcohol, the lithium salts and the TMEDA. The resulting polyethylene, which may be easily removed as by filtration, is highly crystalline and has a substantially fixed molecular weight as shown by its sharp melting point and Mw/Mn ratio.

In any event the n-alkane (either the n-alkyl group bonded to lithium or as part of some other subsequent reaction product or the polyethylene) has a narrow molecular weight range. That is to say, the product will be substantially free of material having molecular weights below and above the principal molecular weight. This can be expressed in terms of the ratio of Mw to Mn. The products of the present method have a Mw/Mn ratio of from 1 to 1.3. The products have the properties of a specific compound. The reason for the foregoing, it is believed, is that polymerization occurs, under the conditions specified, at a rapid rate until a specific chain length, governed by the exact conditions selected, is attained. The material then precipitates from the medium and further polymerization of the precipitated material, under the conditions, is negligible. Thus, under the conditions of the present method, polymerization proceeds to a fixed endpoint, then essentially ceases so that the precipitated product is remarkably uniform. The present invention may also be viewed as a method of controlling the Mw/Mn ratio of polyethylene to within the narrow range of 1 to 1.3.

As stated the temperature of the present reaction will be no higher than 75° C. If a higher temperature is used, significant chain transfer occurs and the TMEDA becomes metallated, forming a different organolithium compound. The temperature may go as low as 0° C. although the use of cooling means is unnecessary. The preferred temperature conditions are from about 30 to about 60° C.

The ethylene pressure will be between about 30 and about 150 p.s.i.g. If a higher pressure is used, the metallated TMEDA will begin to polymerize introducing a high molecular weight impurity which is difficult to remove. Preferably a pressure from about 80 to about 110 p.s.i.g. is used.

At the preferred temperature and pressure the molecular weight of the polyethylene product is about 2000 and its melting point is 120–121° C. In the upper end of the temperature and pressure ranges, the molecular weight is in the range of about 2500 to about 4000; and at the lower end of the temperature and pressure ranges the molecular weight falls in the range of about 1000 to about 1500. Hence, the polyethylene products produced according to the present invention may have a melting point ranging from about 114 to about 125° C. But for any particular polyethylene product, its melting point will be relatively sharp, such as 114–116° C. or 123–125° C., and, as stated, its Mw/Mn ratio will be in the range of 1 to 1.3.

The reaction will be carried out in a liquid alkane solvent. That is the solvent will be a saturated hydrocarbon having from as low as about 4 carbon atoms and up to about 16 carbon atoms, and it may be straight chain or cyclic. Examples of suitable solvents are butane, pentane, hexane, cylcohexane, methylcyclohexane, heptane, octane, decalin, commercial solvent mixtures containing saturated $C_{12}$–$C_{14}$ hydrocarbons, and the like. Hexane and cyclohexane are the preferred solvents.

The n-butyllithium: TMEDA complex is well known. It is recommended that it be freshly prepared as by adding the n-butyllithium and TMEDA, in a substantially 1:1 molar ratio, to the solvent just before reacting the ethylene.

The concentration of the complex in the solvent has not been found to be critical. The long chain n-alkyllithium compound will precipitate from the solvent at a definite end point of polymerization regardless of concentration. However, generally the concentration of n-butyllithium is from about 0.0001 to about 0.1 molar, and preferably from about 0.005 to about 0.05 molar.

In carrying out the reaction, the ethylene, which is a gas, is brought into contact with the solution of the n-butyllithium: TMEDA complex. This may be done by passing the ethylene into the solution or by filling the space above the solution in a closed pressure vessel with the ethylene, preferably with agitation of the solution, as by shaking.

The long chain n-alkyllithium compound begins to precipitate from the solution in 10–15 minutes. The ethylene pressure is maintained for a further period of time, say from ½ to several hours, depending upon the particular temperatures and pressure employed to complete precipitation. Although metallation of the TMEDA occurs slowly under these conditions, it is recommended that prolonged contact, say beyond about 24 hours, between the TMEDA and the long chain n-alklyllithium be avoided. Thus, the product should not be stored for long periods of time before being used for its intended purpose, i.e. use as reagent in a further reaction or conversion to polyethylene.

The present invention will be more readily understood from a consideration of the following examples which are given for the purpose of illustration and are not intended to limit the scope of the invention in any way.

EXAMPLE 1

To 200 ml. of cyclohexane under argon are added, first, 6 ml. of a 15%, by weight, solution of n-butyllithium in hexane and then 1.46 ml. of TMEDA. The argon is replaced by ethylene under a pressure of 90–95 p.s.i.g. and the solution is heated to 50° C. and shaken under the stated ethylene atmosphere and while maintained at 50° C., for about 45 minutes. A precipitate forms. The material is then permitted to cool to room temperature providing a slurry of an n-alkyllithium compound containing about 140 carbon atoms. This compound may be recovered by filtration.

Isopropanol (25 ml.) and then water (150 ml.) are added to the slurry converting the $C_{140}$ n-alkyllithium to a highly crystalline polyethylene which, after filtering and air drying, has a weight average molecular weight (Mw) of 1968 and a number average molecular weight (Mn) of 1872 or a Mw/Mn ratio of 1.05. The Mw and Mn are determined by gel permeation chromatography. This material has a melting point of 120–121° C.

EXAMPLE 2

The procedure of Example 1 is followed except that 200 ml. of hexane are used instead of the cyclohexane and the ethylene pressure is 85 p.s.i.g., the temperature is 32° C. and the time before hydrolysis is 24 hours although reaction was complete within a few hours. The polyethylene has a melting point of 116–118° C.

EXAMPLE 3

The procedure of Example 1 is followed except that 200 ml. of Decalin is used instead of the cyclohexane, and the ethylene pressure is 90 p.s.i.g., the temperature is 50–55° C. and the time is 4 hours. The polyethylene has a melting point of 116–118° C.

EXAMPLE 4

The procedure of Example 1 is followed except that 200 ml. of hexane is used instead of the cyclohexane, and the ethylene pressure is 52 p.s.i.g., the temperature is 20° C. and the time is 18 hours. The polyethylene has a Mw of 2500 and a Mn of 1900 or a Mw/Mn ratio of 1.3. Its melting point is 114–116° C.

EXAMPLE 5

The procedure of Example 1 is followed except that 200 ml. of methylcyclohexane is used instead of the cyclohexane, and the ethylene pressure is 90 p.s.i.g., the temperature is 55° C. and the time is 4 hours. The polyethylene has a melting point of 115–117° C.

EXAMPLE 6

The procedure of Example 1 is followed except that 200 ml. of isopentane is used instead of the cyclohexane, and the ethylene pressure is 90 p.s.i.g., the temperature is 60° C. and the time is 6 hours. The polyethylene has a melting point of 116–118° C.

EXAMPLE 7

The procedure of Example 1 is followed except that 200 ml. of a commercial aliphatic hydrocarbon solvent boiling at about 450° F. and composed of $C_{12}$–$C_{14}$ alkanes is used instead of the cyclohexane, and the ethylene pressure is 90 p.s.i.g., the temperature is 55° C. and the time is 6 hours. The polyethylene has a melting point of 114–116° C.

EXAMPLE 8

To 300 ml. of cyclohexane under argon are added, first, 2 ml. of a 15% by weight, solution of n-butyllithium in hexane and then 0.49 ml. of TMEDA. The argon is replaced by ethylene under a pressure of 90 p.s.i.g. and the solution is heated to 50° C. and shaken, under the stated ethylene atmosphere and while maintained at 50° C., for 6 hours. The resulting polyethylene has a melting point of 117–119° C.

Some modification is possible in the selection of the particular combination of materials, techniques and conditions without departing from the scope of the invention.

What is claimed is:

1. The method of making a long chain n-alkyllithium compound which comprises contacting ethylene with a solution of n-butyllithium: N,N,N',N'-tetramethylenediamine complex, substantially 1:1 molar ratio, in a liquid alkane having from 4 to 16 carbon atoms at a temperature of from about 0 to 75° C. and an ethylene pressure between about 30 and about 150 p.s.i.g. until reaction between said complex and the ethylene and precipitation of the resulting long chain n-alkyllithium compound from said solution are substantially complete, said long chain n-alkyllithium compound being characterized in that, upon removal of the lithium, it provides a highly crystalline polyethylene having a molecular weight of from about 1000 to about 4000, a Mw/Mn ratio of 1 to 1.3 and a melting point of from about 114 to 125° C.

2. The method of claim 1 wherein the temperature is from about 30 to about 60° C.

3. The method of claim 1 wherein the ethylene pressure is from about 80 to about 110 p.s.i.g.

4. The method of claim 1 wherein said liquid alkane is selected from the group consisting of hexane and cyclohexane.

5. The method of claim 2 wherein the ethylene pressure is from about 80 to about 110 p.s.i.g.

6. The method of claim 5 wherein said liquid alkane is selected from the group consisting of hexane and cyclohexane.

7. The method of claim 1 wherein the lithium is removed from said long chain n-alkyllithium compound to provide the corresponding polyethylene by contacting said n-alkyllithium compound with a lower alkyl alcohol or water or both.

8. The method of claim 7 wherein said lithium is removed by contacting said n-alkyllithium compound with water.

9. The method of claim 7 wherein said lithium is removed by contacting said n-alkyllithium compound with a lower alkyl alcohol.

10. The method of claim 8 wherein said lithium is removed by contacting said n-alkyllithium compound first with a lower alkyl alcohol and then with water.

References Cited

UNITED STATES PATENTS 3,451,988   6/1969   Langer _____ 260—94.9

OTHER REFERENCES

Butte, Hydrocarbon Processing, vol. 45, No. 9, September 1966, pp. 277–280.

Eberhardt et al., Jour. Poly. Sci., Part A, vol. 3, 1965, pp. 3753–3762.

JOSEPH L. SCHOFER, Primary Examiner

E. J. SMITH, Assistant Examiner

U.S. Cl. X.R.

260—94.2, 94.6, 878, 413, 632, 635, 665, 668, 683

UNITED STATES PATENT OFFICE
CERTIFICATE OF CORRECTION

Patent No. 3,579,492　　　　　　　　Dated May 18, 1971

Inventor(s) William Novis Smith, Jr.

It is certified that error appears in the above-identified patent and that said Letters Patent are hereby corrected as shown below:

Column 2, line 34 ;　　"aliphatic" (2nd occurrence) should be deleted

Claim 1, lines 3 and 4;　"tetramethylenediamine" should be "tetramethylethylenediamine"

Signed and sealed this 31st day of August 1971.

(SEAL)
Attest:

EDWARD M. FLETCHER, JR.　　　　　WILLIAM E. SCHUYLER, JR.
Attesting Officer　　　　　　　　Commissioner of Patents